Jan. 18, 1966 W. C. DERSCH 3,230,311

DIODE LOGIC CIRCUITRY

Filed Jan. 15, 1962 2 Sheets-Sheet 1

INVENTOR.
WILLIAM C. DERSCH
BY John J. McCormack

United States Patent Office 3,230,311
Patented Jan. 18, 1966

3,230,311
DIODE LOGIC CIRCUITRY
William C. Dersch, Los Gatos, Calif., assignor to International Business Machines Corporation, New York, N.Y., a corporation of New York
Filed Jan. 15, 1962, Ser. No. 166,132
13 Claims. (Cl. 179—1)

This invention relates to a system for pattern matching and here is applied to the analysis of spoken syllables and more particularly to a speech recognition system utilizing Esaki diodes in a logical configuration.

The solution of the very considerable problem of machine recognition of spoken syllables has hitherto involved the most cumbersome systems despite the fact that it has been earnestly studied for the past 40 years. One of the reasons for this is the tremendous number of variables inherent in human speech and between different speakers. Hence, effecting the Herculean task of identifying a word by distinguishing exactly the right parameters from a myriad of possible signals and not confusing it with any other closely similar speech signal has entailed equipment of monumental size. The few prior art speech recognition systems that work at all, however crudely, are enormous in size and entail a myriad of components. Any invention which drastically reduces the complexity, and therefore the size, of a speech recognition system is of great moment and eagerly awaited by workers in the art. The following is such an invention, using Esaki diodes having a negative resistance slope so as to simplify pattern recognition logic and reduce its cost, complexity and power consumption.

One very significant parameter of syllable recognition is syllabic sequence. By this parameter a word may be recognized according to the sequence, as well as the "sound," of its syllables as spoken. Thus, the word "delay" can be distinguished from the word "lady" by virtue of the sequence of the syllables even though they are virtually identical in sound and number. Heretofore, the prior art has endeavored to solve this problem by programming the logic of the recognition circuits so as to identify by syllabic sequence. The instant invention makes such programming, and all its attendant circuitry and component wholly unnecessary by provding logic circuitry which is arranged so as to be inherently sequential. The invention accomplishes this by a unique and unobvious arrangement of tunnel diodes in combination with Esaki pulse shaping means of shorter and higher attenuation.

It is therefore an object of this invention to provide speech recognizing means which has inherent sequential logic.

Another object is to provide a voice recognition system wherein syllabic sequence need not be programmed and may be measured without the need for programming means.

A further object is to provide a speech recognition system that distinguishes signal sequence by virtue of the arrangement of registering means alone.

Yet another object is to provide a simple signal counting circuit having sequence sense by use of tunnel diodes.

Another object is to provide a pulse generating means for an Esaki diode counting circuit.

Still another object is to provide a fast pulse generating means whose pulses are so shortened as to trip only one of a plurality of successive Esaki counting diodes.

A still further object is to provide signal registering means which is faster-acting, lighter and smaller than other such means hitherto known.

The foregoing and other objects, features and advantages of the invention will be apparent from the following more particular description of a preferred embodiment of the invention, as illustrated in the accompanying drawings, wherein.

The way in which the present invention meets and solves the above problem in a new and unobvious manner is by making advantageous use of the discovery that, when connected with the proper impedance relationships, a plurality of tunnel diodes exhibit a "sequence sense." This "sequence sense" is accomplished by loading the impedances to one of the tunnel diodes so that it may be triggered at a lower current and, as a result of its triggering and moving to its high-resistance state, it may precondition a second tunnel diode so as to be, thereafter, triggered by a pulse of lower magnitude. This pre-conditioning mechanism may be used to "sequence" any number of successive tunnel idodes. The mechanism has utility in providing an unprogrammed sequence-sense for a plurality of properly loaded and inter-connected tunnel diodes whereby input pulses may trigger the diodes only in the proper sequence to yield the requisite pre-conditioning enabling a subsequent diode to be triggered by its input pulse. The mechanism may also be used to provide a pulse generator by placing a "pre-conditioning" diode in tandem with a "readout" diode and measuring the output across the load of the "readout" diode which will peak for an ultra-short period, namely the time it takes an Esaki diode to switch from its low to its high resistance condition.

Figure 1:
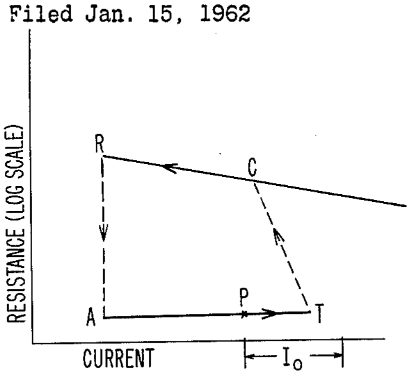
FIG. 1 is a graphical representation of the current-resistance change of a tunnel diode of the type used in the invention.
Figure 5:
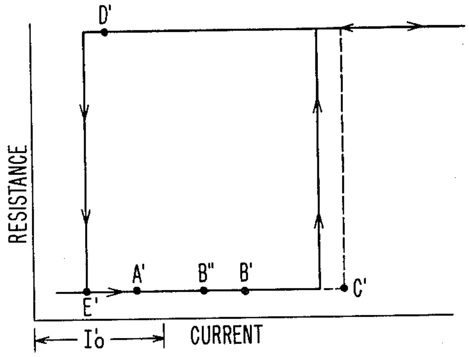
FIG. 5 is a graphical representation of the current-resistance state of the tunnel diodes in FIG. 4 at various stages of successive input pulses.
Figure 9:
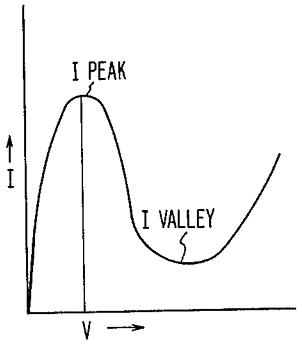
FIG. 9 is a plot of an idealized I–V characteristic of a typical Esaki diode.

The theoretical process whereby the Esaki, or tunnel diode, accomplishes this above mechanism is well known in the art. A tunnel diode is essentially a PN junction semiconductor having a narrow junction which is doped on both sides to a high level of impurity. It functions as an impedance having a forward potential-current characteristic exhibiting a negative resistance slope region beginning at about 50 millivolts and ending at about 200 millivolts forward potential. This effect is graphically represented in FIG. 1. FIG. 9 shows the negative resistance slope in an idealized Esaki diode. The Esaki diode, then, acts like a PN junction diode with a negative resistance region in the lower end of its current-voltage curve. The practical effect of this negative slope resistance region is to establish a transition region for the diode in its current-resistance curve. At either end of this transition region there is a stable resistance plateau. The low resistance plateau is left when one passes a given point in voltage across the junction, usually a few centivolts. At this point the resistance quickly rises to about 15 times its former value, as illustrated in FIG. 1 and FIG. 5. From these plots it is apparent that an Esaki diode has a "resistance-hysteresis" characteristic. This "resistance-hysteresis" is the means whereby the circuit having "sequential-sense" is possible. The transition state between low to high resistance exists for such a short period of time that it is useful for the generation of very rapid pulses as seen below.

In FIG. 1, the resistance of a typical Esaki diode is plotted against current. This is an illustration of both the pre-conditioning mechanism and the resistance-transition mechanism which are utilized in the instant invention. If it is not desired that a given Esaki diode be triggered into resistance transition by a normal sample pulse of given magnitude $I_0$, then the diode and its load resistors are so chosen that transition current of magnitude T is not generated. However, the same Esaki diode may be pre-conditioned by, for example, a neighbor Esaki, so as to trigger at this same normal sample pulse level $I_0$ after pre-conditioning. This is done by "moving" the diode to a state P on its resistance-hysteresis curve, in FIG. 1, as for example, by shunting current through it. Such could be the pre-conditioning current from a second Esaki diode moved from a lower to higher resistance level, so that a current pulse of magnitude $I_0$ is *now* sufficient to "trigger' the given Esaki diode. Triggering consists in changing the resistance state of the diode from that at point P, through T, and up to plateau C–R. Typically, the C–R plateau is 10 to 40 times the magnitude of plateau APT. Once the current drops to R, the resistance de-triggers along path RA.

Figure 2:
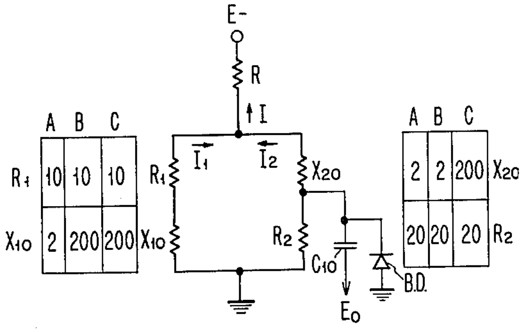
FIG. 2 is a schematic circuit of a pulse generator embodiment of the invention.
Figure 3:
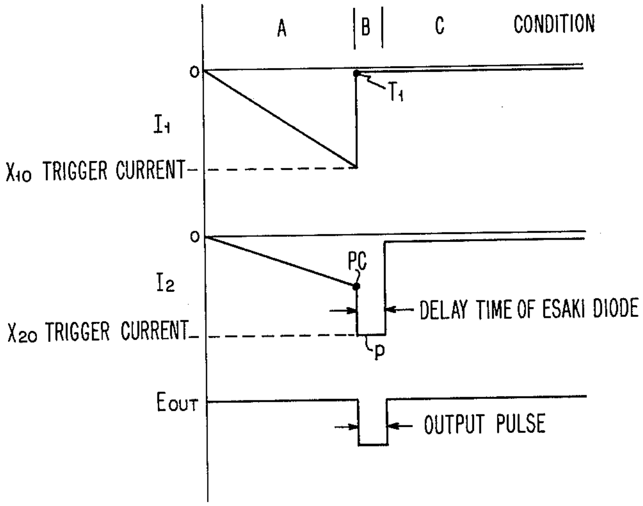
FIG. 3 is a graphic representation of the current conditions and output pulse from the circuit in FIG. 2 at different trigger current levels.

FIG. 2 shows how the above mechanism has been utilized in a novel manner to generate an ultra-rapid pulse. In this schematic representation the letters A, B, and C indicate the state of the circuit shown at selected points in time and the values in the column directly under these letters indicate impedance values representative of the resistances $R_1$ and $R_2$ and Esaki diodes $X_{10}$ and $X_{20}$ in the row opposite them. Both of the Esakis are chosen to possess similar and reasonably symmetrical characteristics. A typical operation of this circuit is described as follows, with reference to the stylized representation of voltage and current in FIG. 3. With no current flowing through the circuit, both the Esaki diodes are in their low conducting region of approximately two ohms. The load resistor $R_1$ for Esaki $X_{10}$ is 10 ohms while the load resistor $R_2$ for Esaki $X_{20}$ is 20 oms and in a complementary position, leaving Esaki $X_{20}$ closer to the power supply E. Condition A is invoked prior to when the current $I_1$ increases to the triggering point for diode $X_{10}$. Prior to triggering, about twice as much current will flow through the $R_1$–$X_{10}$ branch of the circuit since the other branch $X_{20}$–$R_2$ is of substantially higher impedance, about double that of $R_1$–$X_{10}$. However, as the current rises in $X_{10}$, triggering occurs, $X_{10}$ changes to its high impedance state and condition B is invoked. This reverses the current distribution, shunting most of the current down the $X_{20}$–$R_2$ line and producing an output voltage $E_0$ which is the pulse to be generated. Now there is sufficient current through $X_{20}$ to move it to its transition point to cause it to trigger and move to its high resistance condition. The delay time during which this $X_{20}$ transition occurs is extremely short and is represented in FIG. 3 by plateau *p*. Curve $I_2$ of FIG. 3 represents this transitional triggering of $X_{20}$ wherein plateau *p* is in the order of a few millimicroseconds in duration. Capacitor $C_{10}$ in FIG. 2 removes the pedestal from $I_2$ and pulse-shaping backward diode BD prevents positive excursion of $E_0$ at the tailing end of output pulse $E_0$. Pulse-shaping capacitor C and backward diode BD are optional, depending upon the application. Their utility lies in blocking out any positive excursion of output pulse $E_0$. Now, the triggering of $X_{20}$ invokes condition C. Condition C is a stable condition wherein $X_{20}$ has achieved its high resistance condition and, hence, output pulse $E_0$ drops to 0. Thus, a transient and sudden output pulse $E_0$ is experienced during the very short transition time, along plateau *p*, during which $R_2X_{20}$ starts to draw current and then triggers, being induced to do so by the triggering of $X_{10}$.

The particular application for the ultra-short pulse generated as above is for the Esaki sequential pulse register in FIG. 4 circuit which is described as follows. FIG. 5 should be simultaneously referred to as illustrative of the current-resistance states of the Esaki diodes referred to and described in the register circuit. The register circuit is of novel significance in exhibiting sequence-sense by virtue of current preconditioning of diodes in a sequence order. A current division between a "triggering" Esaki (as, for example, O to $T_1$ in FIG. 3 for $X_{10}$ in FIG. 2) and the non triggering Esaki diode next to it in the parallel chain (as, for example O to PC in FIG. 3 for $X_{20}$ in FIG. 2) is such as to provide that next Esaki with enough current to move its resistance characteristic along the resistance-hysteresis curve far enough so that it will "trigger" upon reception of its own normal input pulse (cf. path A to $P_0$ in FIG. 1). Thus, a chain of Esaki diodes may be arranged in parallel so as to register a normal signal pulse by changing resistance states only in a predetermined sequence; that is, to refuse a normal input signal pulse in all cases except when it has been preceded by the triggering of the neighboring Esaki just ahead of it in the registration circuit. Unlike the prior art, this device exhibits an internal, inherent sequence-sense and accomplishes sequence programming without the need for any programming or time components.

Before the sequential registration operation begins, the Esaki diodes are in an "off," or low-resistance, condition shown as point A′ on the curve in FIG. 5. Esaki diodes $X_a$ through $X_e$ are chosen so that a normal sample input pulse, shown as $I_0'$ will be ineffective to trip them. This is where the "sequential-sense" of the registration circuit becomes apparent since the diodes may not be tripped except after preconditioning by the Esaki next ahead of them in the counting sequence. Esaki $X_a$ is chosen of a lower trigger level so that a pulse B′ of typical magnitude may initiate its action at any time while leaving the other Esakis unaffected. Thus $X_a$ is the "starting" or "home" Esaki and initiates the chain of sequential registrations. Once triggered, $X_a$ moves to its high resistance condition (cf. path B′ to D′ in FIG. 5). $X_b$ is now preconditioned, as a result of shunting off some of the "trigger current" through $X_a$, to approximately point B′, while diode $X_e$ is biased to point B′, having shunted a lesser amount of $X_a$'s triggering current. Thus, the circuit is still in a stable condition and will not "run away" at the occurrence of a single initiating pulse on $X_a$ although this initial pulse has biased $X_b$ so that it may now be triggered by its input pulse. Now, when a current pulse input is superimposed on the bias line, it will not affect $X_a$ which has already been triggered, but is sufficient, $X_b$ having been preconditioned into "register condition," to move $X_b$ to the C′ point on the curve, causing it to trigger into its high resistance state and join $X_a$ at point D′. This is the sequential sense of the circuit and the means whereby the sequence is self-programming and need not be otherwise externally controlled.

Note here that Esaki diode $X_c$, although it is pushed close to its firing point, is not triggered by the pulse that caused $X_a$ to trigger. Thus, the ring again is stable, with $X_a$ and $X_b$ in their high-resistance state and $X_c$ through $X_e$ in their low-resistance state. The circuit will stay in this condition until a short pulse appears on the $X_c$ input line causing $X_c$ to trigger, preconditioning $X_d$, and unaffecting $X_e$. Accordingly, the ring will progress to the right in registration sequence.

Figure 4:
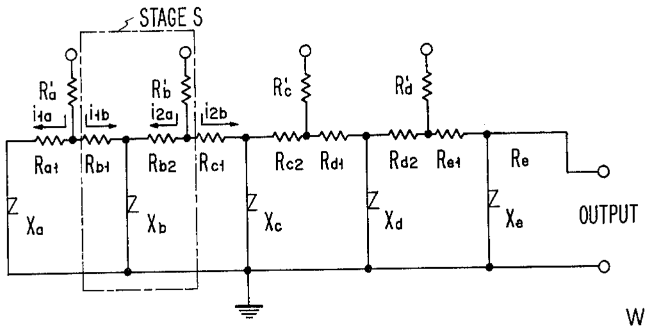
FIG. 4 is a schematic circuit of a sequential register embodiment of the invention.
Figure 8:
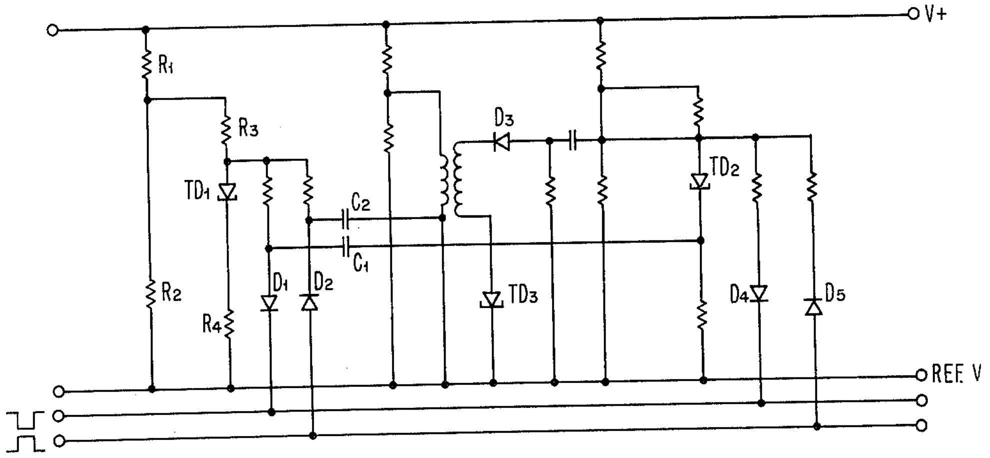
FIG. 8 is a circuit representative of a prior art alternative to the invention.

The saving in programming means is pointedly illustrated by a comparison of the prior art programming means heretofore necessary as shown in FIG. 8, with the invention in FIG. 4. Such a comparison helps to illustrate the problems solved by the instant invention and the simplification of a signal registering system by dispensing with the programming means on the signal transfer means which are no longer necessary when using the invention but have constituted a large number of complex components heretofore. FIG. 8 shows a pulse registering circuit using Esaki diodes and comparable to a single stage of the five stages shown in the circuit in FIG. 4, for example, stage S. As compared with the 3 resistors and 2 Esaki diodes of the stage in the invention, the prior art in FIG. 8 requires 14 resistors, 2 Esaki diodes, 6 other diodes, an expensive transformer, and 3 capacitors. The number and bulk of the components obviated is apparent as well as the attendant reduction in space and cost requirements.

Figure 6:
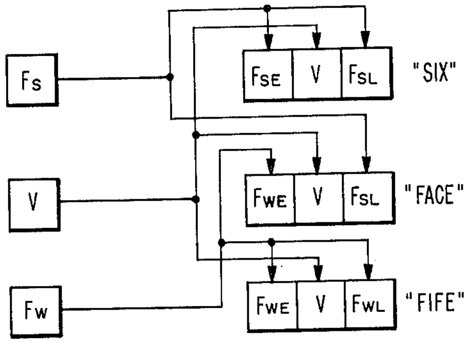
FIG. 6 is a schematic diagram illustrating the application of a sequential register such as shown in FIG. 5 in a voice speech recognition system.

The above described sequential register in combination with the described appropriate pulse generator has particular aptness in the voice recognition art. I have discovered that spoken words may be distinguished according to at least three parameters; voicing, strong frictioning and weak frictioning. I have further been able to distinguish words having syllables which sound the same and differ only according to their sound sequence such as "lady" and "delay." I effect this sequence discrimination according to the above described pulse generator combined with the sequence-register described above. This enables one to adapt a prior art friction-voicing detector to detect sequence also by the mere substitution of suitable Esaki diode registration means for the prior registration means. Such an adaptation is sketched in FIG. 6. The set of word recognition blocks shown in FIG. 6 illustrates the simplicity of the modification of prior art syllable detectors to give them an added sequence-sense according to the invention. In this embodiment, detectors of strong frictioning ($F_s$), voicing (V) and weak frictioning ($F_w$) are shown connected to word recognition blocks, representing the three words "SIX," "FACE," and "FIFE." The words are identified according to syllable quality (e.g., $F_sF_w$) and sequence (e.g., strong friction early $F_{se}$ or weak friction late $F_{wl}$). It should be assumed that these three blocks are part of a larger group of word-blocks comprising the "dictionary" of a voice recognition system. Without some sequencing means for these blocks, a false recognition may occur. For example, the "SIX" block would register positive recognition upon receipt of any combination of $F_s$, V, $F_s$ syllables. Thus, it would not reject a word like "STAY" having the $F_sF_sV$ syllables despite the fact that the order was different from its code word "SIX." The simple substitution of Esaki registers in each of the $F_{se}$, V and $F_{sl}$ boxes as seen in FIG. 4 enables the block to reject "STAY" by virtue of the sequence-sense given it. The other blocks may similarly be easily modified to sense syllabic sequence, giving the word detector a whole new dimension of capability.

Figure 7:
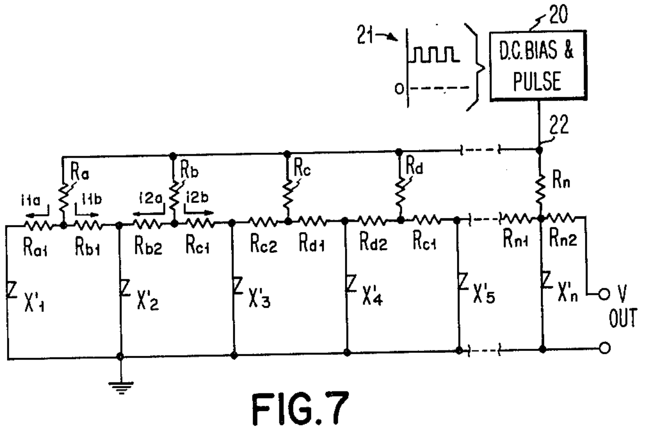
FIG. 7 is a schematic circuit of a pulse counting embodiment of the invention.

Another application of the preconditioning mechanism and pulse-sequencing is shown in FIG. 7 wherein a pulse counting ring is shown. This circuit is so arranged as to register input pulses of predetermined magnitude in a self-ordered, counting sequence. The sequencing operation is induced here, as above, by the requirement of preconditioning current as a condition precedent to the triggering of an Esaki diode and, thus, the counting of a pulse. The source of pulses 20 is provided with a biasing voltage so as to comprise an example of a normalizing means. Adjustment of the bias level enables the same system to count pulses of varying magnitude without otherwise being modified since weak pulses may "ride" on a "carrier" wave of bias voltage of sufficient magnitude so that the voltage sum will trigger an appropriately preconditioned Esaki. Similarly, the bias voltage is lowered for pulses of greater magnitude, maintaining a constant voltage sum at the ring. In the circuit, load resistors $R_a$ through $R_n$ are chosen to sequentially establish the trigger levels. This relationship of pulses and bias magnitude is shown at insert 21. Junction-shunt resistors $R_{b1}$, $R_{b2}$, $R_{c1}$, $R_{c2}$, etc. are selected so as to finely adjust the level of trigger current as well as the precondition-current shunted therefrom. To start the counting sequence $R_{a1}$ must be of substantially less resistance than all other junction resistors, $R_{b1}$, $R_{b2}$, $R_{c1}$, $R_{c2}$, etc. since $X_1'$ gets no preconditioning current. Junction load resistors $R_{b1}$, $R_{c1}$, $R_{d1}$, etc. are selected to finely adjust the registration-current desired at succeeding proconditioned Esaki diodes $X_2'$, $X_3'$, $X_4'$ . . . $X_n'$. The number of Esakis in the counting ring correspond to the maximum number of pulses to be counted. The counting ring will, of course, accept and register pulses in left to right sequence, as did the registration circuit in FIG. 4. The first diode $X_1'$ will register the first pulse in a given train and thereafter "lock-on" in its high resistance state until the current on the input line 22 goes all the way to zero. This is provided for when counting ends or "runs off" the end diode $X_n'$ of the ring by a cutout in the input line 22. Such a cutout provides "reset" condition for counting a new train of pulses starting all over again with $X_1'$. The sequencing mechanism down the ring in order of diode location ($X_1'$ to $X_2'$ to $X_3'$ . . . $X_n'$) is controlled, as in the other embodiments, by shunting sufficient current from a triggering Esaki to its neighbor Esaki, next in line so that the latter will, in turn, be triggered by the next pulse input on the line 22. This self-ordering or self-sequencing counting circuit has many applications and is especially useful where a counting ring must be small, simple and inexpensive. In the voice recognition art, for example, it is especially useful for measuring syllable count.

The pulses driving this registration circuit described above must, of course, be shorter than the time necessary for two Esaki diodes to switch—a very short pulse, not possible using prior art devices. The pulse must therefore be extremely short and extremely well-controlled, being of just enough duration to trigger one Esaki but not so long as to trigger a second Esaki. This may be characterized as an "Esaki-trigger" pulse, being exactly of that duration. It is apparent that it is just such a pulse that the circuit in FIG. 2 will generate. Hence, the sequence-registering system in FIG. 7 should operate in tandem with a pulse-generator such as shown in FIG. 2. Such an arrangement is shown in FIG. 6, for voice recognition utility.

While the above described combination of pulse shaping circuit and sequential pulse registration circuit is particularly apt for voice recognition purposes, it has other and broader utility. One such alternative application is for pattern recognition purposes wherein the pulse to be shaped and registered sequentially would derive from a pattern detector. Such an application would be a useful adjunct to machines that detect and interpret the printed word.

While the invention is particularly shown and described with reference to preferred embodiments thereof, it will be understood by those skilled in the art that various changes in form and details may be made therein without departing from the spirit and scope of the invention.

I claim:

1. In a current pulse registering device adapted to detect a pre-determined sequence of pulse signals from a plurality of pulse sources, the combination comprising a plurality of input signal means, a plurality of associated input signal terminals, a ground terminal, a plurality of semi-conductive devices of the negative-resistance slope type connected in parallel between one of said signal terminals and ground, a plurality of three-terminal load impedances having a centrally-connected resistance associated with each terminal wherein the first terminal is connected to said input signal means and the second and third terminals are connected to adjacent ones of said input signal terminals, and an output terminal for registering the occurrence of all signals in a counting sequence.

2. The device described in claim 1 wherein said semi-conductive devices comprise Esaki diodes having a trigger-current range in the range of input current pulses and wherein said load impedances comprise resistors whose magnitude is substantially the same for all Esaki diodes except the first in line, the magnitude of which is substantially less than the other resistors so as to allow initiation of the register sequence.

3. The device as described in claim 2 wherein said signal means comprise syllable detecting means for generating a pulse in response to an audible enunciated syllable and pulse shaping means for shaping the pulse to be of a magnitude less than that which will trip successive Esaki diodes.

4. A system for detecting the ordered occurrence of a plurality of signals in a particular predetermined sequence comprising, in combination, a plurality of pulse-normalizing means for normalizing the period of said signals, a plurality of solid state devices connected in predetermined sequence and in parallel, said devices being chosen to exhibit a bilevel square resistance-current characteristic, and a ground terminal, a plurality of connecting means connecting adjacent pairs of said devices between said ground terminal and a different one of said normalizing means, part of said connector means including center-tapped current-dividing impedances connecting adjacent of said devices, the tap thereof being connected to one of said normalizing means, and output means connected across the terminal one of said devices in said ordered sequence for sensing the switched state thereof.

5. A system as recited in claim 4, wherein said solid state devices comprise Esaki diodes.

6. The system as recited in claim 5 wherein said pulse-normalizing means comprise an input terminal, a reference terminal, a first Esaki switching means having two resistance states and connected between said input and reference terminals, a second Esaki switching means connected in parallel with said first switching means and having two resistance states, the values of which are selected to fall between the two states of said first switching means and to differ substantially therefrom, and output means connecting said reference terminal and said second switching means.

7. In a pulse registering system for sequence recognition of a plurality of signals, the combination comprising a plurality of signal input means for presenting each of said signals to said system, an output terminal, a reference terminal, a plurality of unidirectional, bistable devices connected in ordered sequence and in parallel to said reference terminal, and impedance-divider means connecting each of said input means with successive pairs of said devices so that a switching from the first to second bistable state of any device preconditions the sequentially adjacent device for switching whereby said signals may be detected in sequence.

8. The system as recited in claim 7 wherein said devices comprise Esaki diodes and said input means include pulse-normalizing means for normalizing the period of said signals to an Esaki switching period, characteristic of said diodes.

9. The system as recited in claim 8 wherein said normalizing means comprise a pair of Esaki diodes disposed in parallel and arranged to switch successively, whereby the switching time of one diode may constitute the normalized period.

10. A signal registering system comprising:

a plurality of input means, a ground terminal, an output terminal, a plurality of current-divider means joined in series to said output terminal and connecting said input means, and a plurality of unidirectional, bistable solid state devices, each connected in ordered sequence and in parallel between said ground terminal and a junction of said divider means so that a switching from the first to second bistable state of any device preconditions the sequentially adjacent device for switching whereby a predetermined order of signals on said input means may be indicated.

11. A registering system as recited in claim 10 wherein said input means include pulse-normalizing means whereby pulses to said solid state devices are time-normalized.

12. A counting system as recited in claim 11 wherein said solid state devices are Esaki diodes having common characteristic switching times and wherein said pulse-normalizing means comprise Esaki-switching-pulse generating means.

13. A counting system as recited in claim 12 wherein said current-divider means comprise resistor pairs having impedance values selected so as to divide pulse current into "switching" and "preconditioning" levels, and wherein the impedance connected to the first diode in said sequence order is substantially less than the other of said impedances.

References Cited by the Examiner

UNITED STATES PATENTS

| | | | |
|---|---|---|---|
| 2,614,141 | 10/1952 | Edson et al. | 307—88.5 |
| 2,859,385 | 11/1958 | Bentley | 315—169 |
| 3,036,268 | 5/1962 | Smith | 324—77 |
| 3,040,190 | 6/1962 | Buelow | 307—88.5 |

ROBERT H. ROSE, *Primary Examiner.*